US008249864B2

(12) United States Patent
Lee et al.

(10) Patent No.: US 8,249,864 B2
(45) Date of Patent: Aug. 21, 2012

(54) FIXED CODEBOOK SEARCH METHOD THROUGH ITERATION-FREE GLOBAL PULSE REPLACEMENT AND SPEECH CODER USING THE SAME METHOD

(75) Inventors: Eung Don Lee, Daejeon (KR); Jong Mo Sung, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 749 days.

(21) Appl. No.: 12/442,554

(22) PCT Filed: Apr. 11, 2007

(86) PCT No.: PCT/KR2007/001749

§ 371 (c)(1),
(2), (4) Date: Mar. 24, 2009

(87) PCT Pub. No.: WO2008/044817

PCT Pub. Date: Apr. 17, 2008

(65) Prior Publication Data

US 2010/0088091 A1 Apr. 8, 2010

(30) Foreign Application Priority Data

Oct. 13, 2006 (KR) ........................ 10-2006-0099769

(51) Int. Cl.
*G10L 19/00* (2006.01)
*G10L 15/00* (2006.01)

(52) U.S. Cl. ........................................ 704/219; 704/230

(58) Field of Classification Search ........................ None
See application file for complete search history.

(56) References Cited

U.S. PATENT DOCUMENTS 5,528,727 A * 6/1996 Wang ............................ 704/223

(Continued)

FOREIGN PATENT DOCUMENTS

CN 1766988 A 5/2006

(Continued)

OTHER PUBLICATIONS

Hochong Park, et al; Efficient CodeBook Search Method for ACELP Speech Codecs; Speech Coding, 2002, IEEE Workshop Proceedings. Oct. 6, 2002. pp. 17-19.

(Continued)

*Primary Examiner* — Brian Albertalli
(74) *Attorney, Agent, or Firm* — Ladas & Parry LLP

(57) ABSTRACT

Provided are a fixed codebook search method based on iteration-free global pulse replacement in a speech codec, and a Code-Excited Linear-Prediction (CELP)-based speech codec using the method. The fixed codebook search method based on iteration-free global pulse replacement in a speech codec includes the steps of: (a) determining an initial codevector using a pulse-position likelihood vector or a correlation vector; (b) calculating a fixed-codebook search criterion value for the initial codevector; (c) calculating fixed-codebook search criterion values for respective codevectors obtained by replacing a pulse of the initial codevector each time for respective tracks, and determining a pulse position generating the largest fixed-codebook search criterion value as a candidate pulse position for the respective tracks, respectively; (d) calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) comparing the fixed-codebook search criterion value for the initial codevector obtained in step (b) with the largest value determined in step (d) to determine an optimum fixed codevector.

7 Claims, 3 Drawing Sheets

U.S. PATENT DOCUMENTS

| | | | | |
|---|---|---|---|---|
| 7,003,461 | B2 * | 2/2006 | Tavares | 704/262 |
| 7,096,181 | B2 * | 8/2006 | Jung et al. | 704/222 |
| 7,206,739 | B2 * | 4/2007 | Lee | 704/208 |
| 7,302,386 | B2 * | 11/2007 | Lee et al. | 704/220 |
| 7,496,504 | B2 * | 2/2009 | Lee et al. | 704/219 |
| 7,739,108 | B2 * | 6/2010 | Lee et al. | 704/219 |
| 2002/0095284 | A1 | 7/2002 | Gao | |
| 2004/0193410 | A1 | 9/2004 | Lee et al. | |
| 2005/0256702 | A1 * | 11/2005 | Vadapalli | 704/223 |
| 2007/0043560 | A1 * | 2/2007 | Lee | 704/219 |

FOREIGN PATENT DOCUMENTS

| | | | |
|---|---|---|---|
| JP | 06-186998 | A | 7/1994 |
| KR | 1020010076622 | A | 8/2001 |
| KR | 1020010095585 | A | 11/2001 |
| KR | 1020040041716 | A | 5/2004 |
| KR | 1020040042368 | A | 5/2004 |
| KR | 1020040083903 | A | 10/2004 |

OTHER PUBLICATIONS

Eung-Don Lee, et al; "Global Pulse Replacement Method for Fixed CodeBook Search of ACELP Speech Codec", Proceedings of the 2nd IASTED International Conference on CIIT 2003. (Nov. 2003), pp. 372-375.

"G.729 based Embedded Variable bit-rate coder: An 8-32 kbit/s scalable wideband coder bitstream interoperable with G.729", ITU-T, Series G: Transmission Systems and Media, Digital Systems and Networks, Digital terminal equipments—Coding of analogue signals by methods other than PCM—International Telecommunications Union.

International Search Report; mailed Jul. 16, 2007; PCT/KR2007/001749.

* cited by examiner

[Fig. 1] PRIOR ART
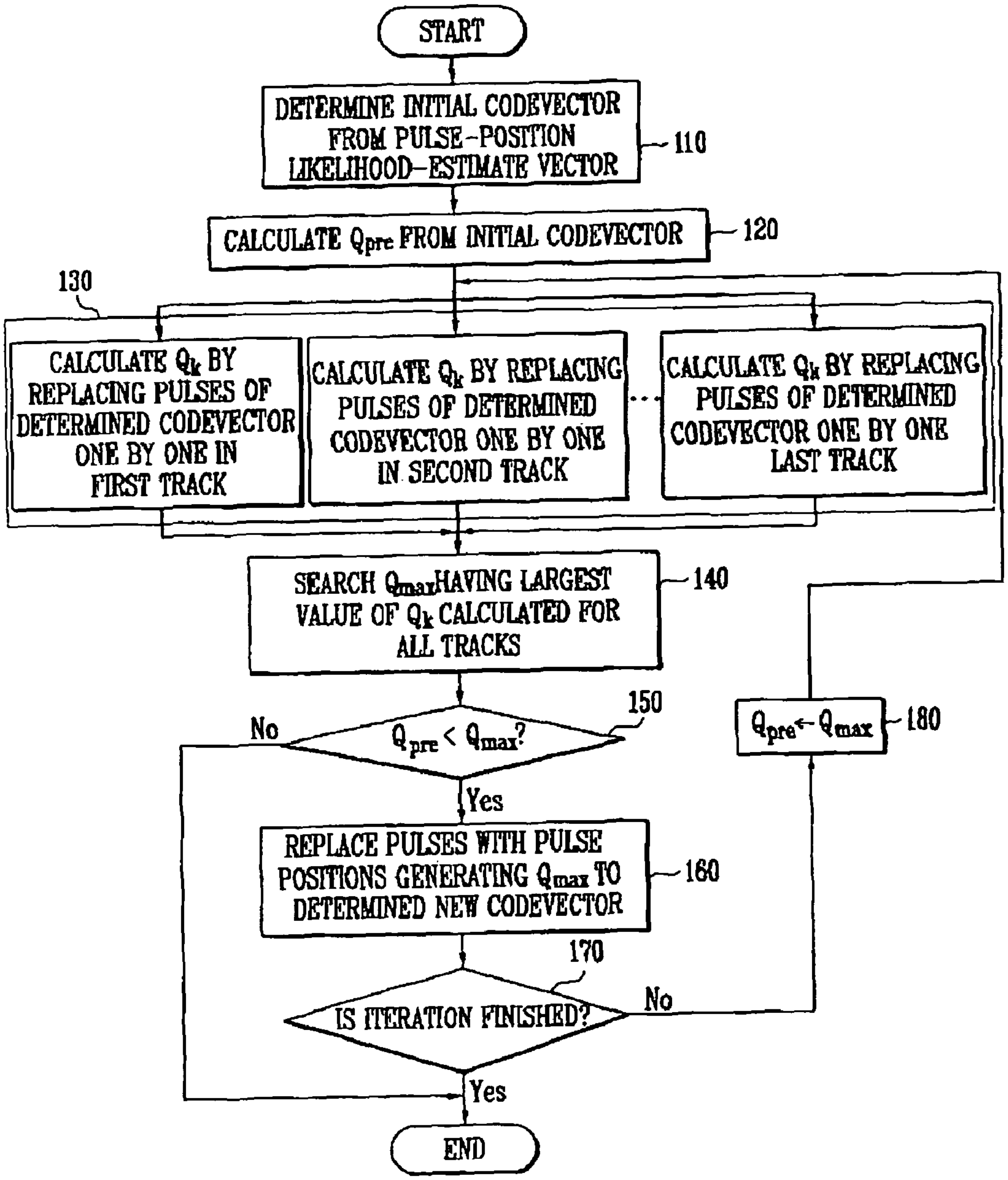

[Fig. 2]
(a) PRIOR ART
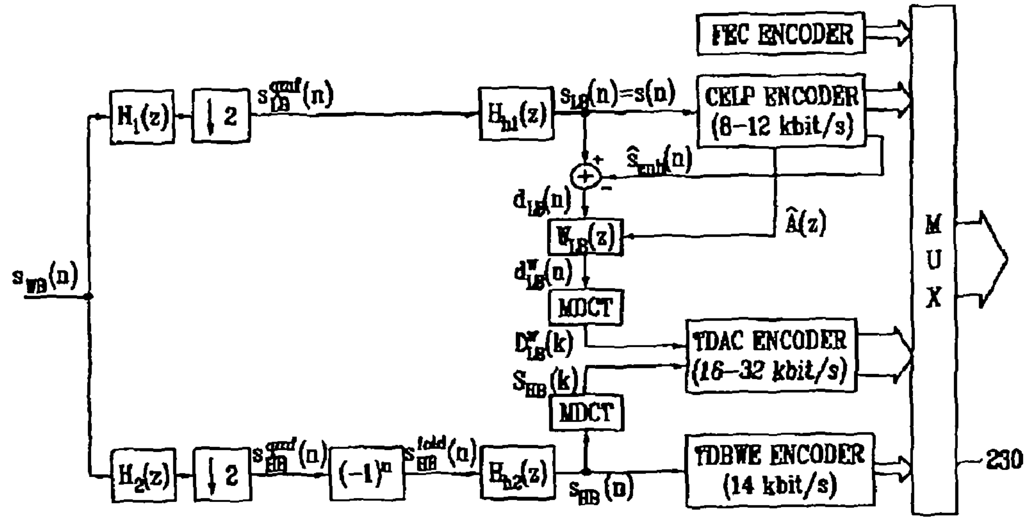
(b) PRIOR ART
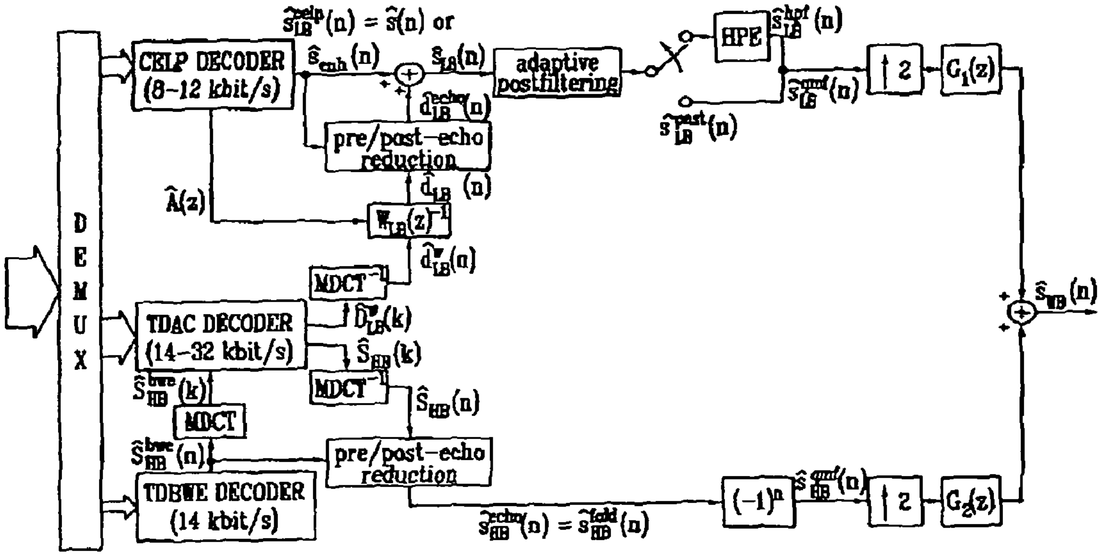

[Fig. 3]
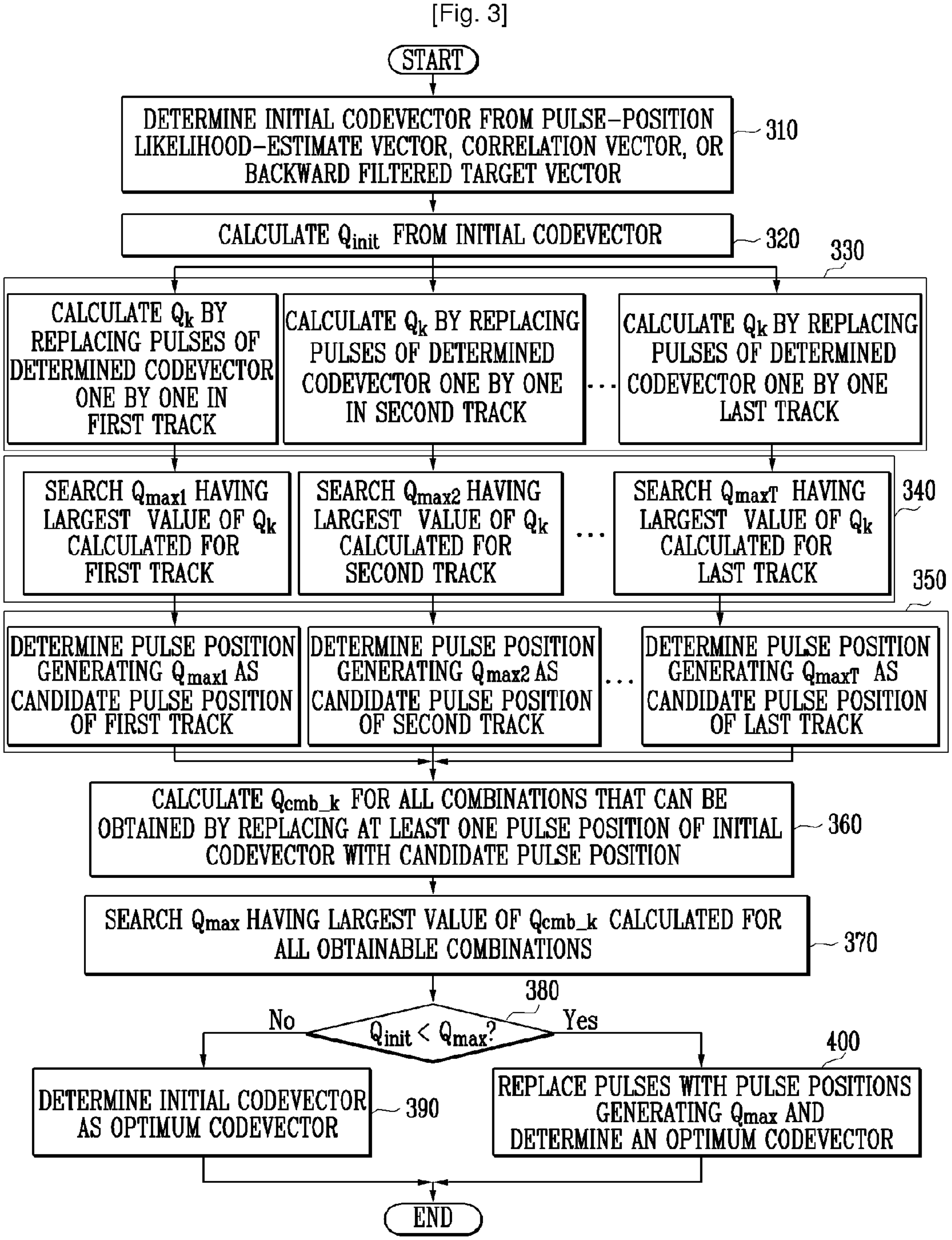

FIXED CODEBOOK SEARCH METHOD THROUGH ITERATION-FREE GLOBAL PULSE REPLACEMENT AND SPEECH CODER USING THE SAME METHOD

TECHNICAL FIELD

The present invention relates to a fixed codebook search method based on iteration-free global pulse replacement in a speech codec, and a Code-Excited Linear-Prediction (CELP)-based speech codec using the method. More particularly, the present invention relates to a method of searching a fixed codebook at high-speed on the basis of iteration-free global pulse replacement in a speech codec using an algorithm such as an Algebraic CELP (ACELP) algorithm, and a CELP-based speech codec using the method.

BACKGROUND ART

Conventionally, a full search method used in G.723.1 6.3-kbps speech codecs, a focused search method used in G.729 and G.723.1 5.3-kbps speech codecs, a depth-first tree search method used in G.729A, adaptive multi-rate (AMR)-narrow band (NB), AMR-wideband (WB) speech codecs, etc. are used as a fixed codebook search method.

Above-mentioned search methods have a problem of a heavy computational load compared with sound quality. To solve the problem, Korean Patent No. 10-0556831 (corresponding U.S. Patent Application Publication No. US20040193410), which was applied by the same applicant as the present application and registered, discloses a fixed codebook search method based on global pulse replacement. The method is used as a fixed codebook search method of 8 kbps mode in a G.729.1 speech codec adopted as an International Telecommunication Union-Telecommunication standardization sector (ITU-T) standard in April, 2006. The fixed codebook search method based on global pulse replacement disclosed in the patent will be described now with reference to FIG. 1.

As illustrated in FIG. 1, a conventional global-pulse replacement method comprises the steps of: determining an initial codevector from a pulse position likelihood estimate vector (step 110); calculating a criterion value $Q_{pre}$ used for searching a fixed codebook in an Algebraic Code-Excited Linear-Prediction (ACELP) speech coding method, from the initial codevector (step 120); calculating fixed codebook search criterion values for respective codevectors obtained by replacing pulses of the provisionally determined codevector one by one according to respective tracks (step 130); searching a largest value $Q_{max}$ of the criterion values obtained by pulse replacement of all the tracks (step 140); comparing the largest value $Q_{max}$ with the criterion value $Q_{pre}$ calculated from the codevector before pulse replacement (step 150); when the largest value $Q_{max}$ is larger than the criterion value $Q_{pre}$ before pulse replacement, replacing a pulse with a pulse position generating the largest value $Q_{max}$ and determining a new codevector (step 160); and after the steps 130 to 160 are iterated for predetermined times, finishing pulse replacement (steps 170 and 180).

In other words, according to the conventional global-pulse replacement method, pulse replacement is iterated in each pulse replacement process so that a criterion value continuously increases. Therefore, with the iteration of the pulse replacement process, an optimum codevector can be rapidly searched, but a computational load increases.

DISCLOSURE OF INVENTION

Technical Problem

The present invention is directed to a fixed codebook search method capable of remarkably reducing a computational load by removing iterated processes from a conventional global-pulse replacement method.

The present invention is also directed to a fixed codebook search method capable of improving sound quality of the conventional global-pulse replacement method by using a pulse-position likelihood-estimate vector or a correlation vector appropriately for linguistic characteristics.

Technical Solution

One aspect of the present invention provides a fixed codebook search method in a speech codec, comprising the steps of: (a) determining an initial codevector using a pulse-position likelihood vector or a correlation vector; (b) calculating a fixed-codebook search criterion value for the initial codevector; (c) calculating fixed-codebook search criterion values for respective codevectors obtained by replacing pulses of the initial codevector one by one according to respective tracks, and determining pulse positions generating the largest values of the fixed-codebook search criterion values as candidate pulse positions of the respective tracks; (d) calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) comparing the fixed-codebook search criterion value for the initial codevector obtained in step (b) with the largest value determined in step (d) to determine an optimum fixed codevector.

In step (a), a pulse-position likelihood-estimate vector or a correlation vector may be used according to characteristics of a language to be processed by the speech codec.

In steps (b) to (d), fixed-codebook search criterion values may be calculated using a correlation vector or a pulse-position likelihood-estimate vector according to characteristics of a language to be processed by the speech codec.

In addition, step (e) may comprise the steps of: (e1) when it is determined that the fixed-codebook search criterion value for the initial codevector is larger than the largest value determined in step (d), determining the initial codevector as an optimum fixed codevector; and (e2) when it is determined that the largest value determined in step (d) is larger than the fixed-codebook search criterion value for the initial codevector, determining a codevector generating the largest value as an optimum codevector.

Another aspect of the present invention provides a Code-Excited Linear-Prediction (CELP) encoder comprising a linear prediction analyzer, an adaptive codebook searcher, and a fixed codebook searcher, wherein to search a fixed codebook by global pulse replacement, the fixed codebook searcher comprises: (a) means for determining an initial codevector using a pulse-position likelihood-vector or a correlation vector; (b) means for calculating a fixed-codebook search criterion value for the initial codebook vector; (c) means for calculating fixed-codebook search criterion values of respective codevectors obtained by replacing pulses of the initial codevector one by one according to respective tracks, and determining pulse positions generating the largest values of the fixed-codebook search criterion values as candidate pulse positions of the respective tracks; (d) means for calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) means for comparing the fixed-codebook search criterion value for the initial codevector obtained by the means (b) with the largest value determined by the means (d) to determine an optimum fixed codevector.

Yet another aspect of the present invention provides a CELP encoder, comprising: a linear prediction analyzer for removing redundancy between speech samples by linear prediction; an adaptive codebook searcher for obtaining, by adaptive codebook search, a pitch from the speech samples between which the redundancy was removed; and a fixed codebook searcher for searching a codeword that is most similar to the speech samples, where the redundancy between the speech samples and the pitch have been removed, from a fixed codebook. Here, the fixed codebook searcher performs fixed codebook search based on iteration-free global pulse replacement.

Still another aspect of the present invention provides a CELP-based speech codec comprising an encoder and a decoder, wherein the encoder comprises: Quadrature Minor Filter (QMF) banks for dividing an input signal into low-band input signal and high-band input signal; a high-pass filter for performing a preprocess of removing frequency components equal to or less than a predetermined frequency from the low-band input signal; a CELP encoder for encoding a signal output from the high-pass filter to generate a narrow-band synthesis signal; a perceptual weighting filter for weighting a difference signal between the signal preprocessed by the high-pass filter and the synthesis signal generated by the CELP encoder; a first Modified Discrete Cosine Transform (MDCT) for converting the difference signal weighted by the perceptual weighting filter into a frequency-domain signal; a low-pass filter for performing a preprocess of removing frequency components more than a pre-determined frequency from the high-band input signal; a Time-Domain Bandwidth Extension (TDBWE) encoder for encoding the signal preprocessed by the low-pass filter; a second MDCT for converting the signal preprocessed by the low-pass filter into a frequency-domain signal; and a Time-Domain Aliasing Cancellation (TDAC) encoder for encoding the frequency-domain signals converted by the MDCTs. Here, the CELP encoder performs fixed codebook search based on iteration-free global pulse replacement.

Still yet another aspect of the present invention provides an audio terminal having the above-described CELP-based speech codec.

Advantageous Effects

According to the present invention, it is possible to remarkably reduce a computational load in comparison with a conventional global-pulse replacement method, while maintaining sound quality as is.

BRIEF DESCRIPTION OF THE DRAWINGS

FIG. 1 is a flowchart showing a fixed codebook search method based on global pulse replacement according to an embodiment of conventional art;

FIGS. 2A and 2B are functional diagrams of an encoder and a decoder of a G.729EV codec to which the present invention is applied; and FIG. 3 is a flowchart showing a fixed codebook search method based on iteration-free global pulse replacement according to an exemplary embodiment of the present invention.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

The present invention can be applied to a G.729-based embedded variable bit-rate (EV) codec conforming to International Telecommunication Union-Telecommunication standardization sector (ITU-T) standards. Encoder input and decoder output of the G.729EV codec are sampled at 16000 Hz. A bitstream generated by an encoder consists of 12 embedded layers, which are referred to as Layers 1 to 12. Layer 1 is a core layer corresponding to a bit rate of 8 kbit/s, Layer 2 is a narrow-band enhancement layer corresponding to a bit rate of 12 kbit/s, and Layers 3 to 12 are wideband enhancement layers corresponding to a bit rate of 20 kbit/s increasing by 2 kbit/s.

The G.729EV codec has a 3-stage structure of embedded Code-Excited Linear-Prediction (CELP) coding, Time-Domain Bandwidth Extension (TDBWE) coding, and Time-Domain Aliasing Cancellation (TDAC) coding. The embedded CELP coding stage generates Layers 1 and 2 generating narrow-band synthetic sound of 8 and 12 kbit/s (50 to 4000 Hz), and the TDBWE coding stage generates Layer 3 generating wideband output of 14 kbit/s (50 to 7000 Hz). The TDAC coding stage operates in a Modified Discrete Cosine Transform (MDCT) domain and generates Layers 4 to 12 of 14 to 32 kbit/s to improve sound quality.

FIGS. 2A and 2B are functional diagrams of an encoder and a decoder of a G.729EV codec. As illustrated in FIG. 2A, the encoder divides an input signal $S_{WB}(n)$ into 2 sub-bands using Quadrature Mirror Filter (QMF) banks illustrated as $H_1(z)$ and $H_2(z)$. Then, a low-band input signal obtained through a decimation $\downarrow 2$ is preprocessed by a high-pass filter $H_{h1}(z)$ to remove frequency components of less than a pre-determined frequency, e.g., 50 Hz, and a signal $S_{LB}(n)$ according to the result is processed by a narrow-band CELP encoder. The CELP encoder generates a synthetic signal $$\hat{S}_{enh}(n)$$

through the processes of Linear Prediction (LP) analysis, adaptive codebook search, and fixed codebook search. The LP analysis is a process of removing redundancy between speech samples. The adaptive codebook search is a process of obtaining pitch of the redundancy-removed speech samples. The fixed codebook search is a process of searching a codeword that is the most similar to the speech samples, where redundancy between the speech samples and the pitch components are removed, from a fixed codebook.

Subsequently, a signal $d_{LB}(n)$ denoting difference between a signal S(n) pre-processed by the high-pass filter $H_{h1}(z)$ and the synthetic signal $$\hat{S}_{enh}(n)$$

generated by the CELP encoder is weighted by a perceptual weighting filter $W_{LB}(z)$. Parameters of the perceptual weighting filter $W_{LB}(z)$ are derived from LP coefficients quantized by the CELP encoder. In addition, the perceptual weighting filter $W_{LB}(z)$ performs gain compensation to ensure spectral continuity between its own output and a high-band input signal $S_{HB}(n)$. The output of the perceptual weighting filter $W_{LB}(z)$ is converted into a frequency-domain signal by a first MDCT.

Meanwhile, a high-band input signal obtained through a decimation ↓2 and a spectral folding $(-1)^n$ is preprocessed by a low-pass filter $H_{h2}(z)$ to remove frequency components of a predetermined frequency, e.g., 3000 Hz, and above, and a signal according to the result is encoded by a TDBWE encoder. In addition, a second MDCT converts the signal preprocessed by the low-pass filter $H_{h2}(z)$ into a frequency-domain signal. The signals, i.e., MDCT coefficients, converted into the frequency-domain by the MDCTs are finally encoded by a TDAC encoder. In addition, some parameters are transferred by a forward error correction (FEC) encoder to insert parameter-level redundancy into a bitstream for improving sound quality.

FIG. 2B illustrates functions of a G.729EV decoder. The decoder performs the inverse process of the above described encoder, thereby performing decoding. The decoding process is changed according to the number of layers actually received by the decoder or the received bit rate. When the received bit rate is 8 kbit/s (including Layer 1) or 12 kbit/s (Layers 1 and 2), CELP decoding is performed. When the received bit rate is 14 kbit/s (including Layers 1 to 3), CELP decoding and TDBWE decoding are performed. When the received bit rate exceeds 14 kbit/s (including at least 4 layers), TDAC decoding besides CELP decoding and TDBWE decoding are performed. The structure and functions of the G.729EV encoder and decoder are disclosed in detail in ITU-T G.729.1 ("G.729 based Embedded Variable bit-rate coder: An 8-32 kbit/s scalable wideband coder bitstream interoperable with G.729", laid open in May, 2006), and thus it is recommended to refer to the same.

As described above, the present invention is applied to the speech codec illustrated in FIGS. 2A and 2B, and an exemplary embodiment of the present invention will be described below on the basis of a G.729.1 8-kbps mode. In the G.729.1 8-kbps mode, a total number M of pulse positions of a subframe is 40, and a number $N_P$ of pulses in a subframe is 4.

Fixed codebook search performed in the CELP encoder is to select a codevector maximizing Formula 1 below.

$$\max_k Q_k = \max_k \frac{C_k^2}{E_k} = \max_k \frac{(d^t c_k)^2}{c_k^t \Phi c_k} \quad \text{[Formula 1]}$$

Here, $c_k$ denotes a k-th fixed codevector, and t denotes a transpose matrix. In addition, d denoting a correlation vector or backward filtered target vector and ϕ denoting an autocorrelation matrix are expressed in the following formulas, respectively.

$$d(n) = \sum_{i=n}^{M-1} x_2(i)h(i-n),\ i = 0, \ldots, M \quad \text{[Formula 2]}$$

$$\phi(i, j) = \sum_{n=j}^{M-1} h(n-i)h(n-j), \quad \text{[Formula 3]}$$

$$i = 0, \ldots, M,\ j = i, \ldots, M$$

Here, M denotes the total number of pulse positions of a subframe, $x_2(n)$ denotes a target signal for fixed codebook search, and h(n) denotes an impulse response of an LP synthesis filter.

Table 1 below shows a fixed codebook structure in the G.729.1 8-kbps mode. As shown in Table 1, M in the G.729.1 8-kbps mode is 40.

TABLE 1

| Track | Pulse | Pulse position |
|---|---|---|
| 0 | $i_0$ | 0, 5, 10, 15, 20, 25, 30, 35 |
| 1 | $i_1$ | 1, 6, 11, 16, 21, 26, 31, 36 |
| 2 | $i_2$ | 2, 7, 12, 17, 22, 27, 32, 37 |
| 3 | $i_3$ | 3, 8, 13, 18, 23, 28, 33, 38, 4, 9, 14, 19, 24, 29, 34, 39 |

In addition, the numerator and the denominator of Formula 1 may be expressed in Formula 4 and 5 below, respectively.

$$C = \sum_{i=0}^{N_P-1} s_i d(m_i) \quad \text{[Formula 4]}$$

$$E = \sum_{i=0}^{N_P-1} \phi(m_i, m_i) + 2\sum_{i=0}^{N_P-2}\sum_{j=i+1}^{N_P-1} s_i s_j \phi(m_i, m_j) \quad \text{[Formula 5]}$$

Here, $N_P$ denotes the number of pulses in a subframe ($N_P$=4 in the G.729.1 8-kbps mode), $m_i$ denotes an i-th pulse position, and $s_i$ and $s_j$ denote i-th and j-th pulse signs, respectively. In the present invention, a pulse sign may be determined using the correlation vector d, or a pulse-position likelihood-estimate vector b, according to characteristics of a language to be encoded by the codec. In other words, a pulse sign can be expressed as follows: $s_j$=sign{d(i)} or $s_i$=sign{b(i)}.

b(n) denotes an n-th argument of a pulse-position likelihood-estimate vector and is expressed in Formula 6 below.

$$b(n) = \frac{r_{LTP}(n)}{\sqrt{\sum_{i=0}^{M-1} r_{LTP}(i) r_{LTP}(i)}} + \frac{d(n)}{\sqrt{\sum_{i=0}^{M-1} d(i)d(i)}} \quad \text{[Formula 6]}$$

Here, $r_{LTP}$ (n) denotes a long-term prediction signal, and thus b(n) may be referred to as a function of the long-term prediction signal and correlation.

FIG. 3 is a flowchart showing a fixed codebook search method based on iteration-free global pulse replacement according to an exemplary embodiment of the present invention.

First, in step 310, an initial codevector is determined using a pulse-position likelihood-estimate vector or a correlation vector. This is performed by selecting pulse positions numbering $N_P$ per track, i.e., the number of tracks *$N_P$ in total, in decreasing order of absolute values of arguments in the pulse-position likelihood-estimate vector or the correlation vector for respective pulse positions of each track.

Table 2 below shows absolute values of arguments in a pulse-position likelihood-estimate vector for respective pulse positions of tracks 0 to 3 in a specific subframe of the G.729.1 8-kbps mode. Referring to Table 2, the pulse positions of an initial codevector ($i_0$, $i_1$, $i_2$, $i_3$) are (30, 31, 32, 28).

TABLE 2

| Track | Absolute values of arguments in pulse-position likelihood-estimate vector |
|---|---|
| 0 | 0.10, 0.31, 0.15, 0.02, 0.10, 0.17, 0.67, 0.35 |
| 1 | 0.29, 0.07, 0.06, 0.21, 0.00, 0.04, 0.32, 0.00 |
| 2 | 0.36, 0.17, 0.06, 0.04, 0.34, 0.29, 0.66, 0.05 |
| 3 | 0.18, 0.08, 0.43, 0.06, 0.10, 0.48, 0.16, 0.12, 0.33, 0.05, 0.13, 0.26, 0.11, 0.11, 0.11, 0.05 |

In step 320, a fixed-codebook search criterion value $Q_{init}$ used for searching a fixed codebook is derived from the initial codevector. The fixed-codebook search criterion value $Q_{init}$ is calculated from the initial codevector using Formula 1.

In step 330, fixed-codebook search criterion values $Q_k$ are calculated for respective codevectors obtained by replacing pulses of the initial codevector one by one according to the respective tracks. For example, according to the pulse positions (30, 31, 32, 28) of the initial codevector of Table 2, when the pulse position of track 0 is replaced, fixed-codebook search criterion values $Q_k$ are calculated for respective codevectors (0, 31, 32, 28), (5, 31, 32, 28), (10, 31, 32, 28), (15, 31, 32, 28), (20, 31, 32, 28), (25, 31, 32, 28), and (35, 31, 32, 28) obtained by replacing a pulse position "30" with another pulse position. When the pulse position of track 1 is replaced, fixed-codebook search criterion values $Q_k$ are calculated for respective codevectors (30, 1, 32, 28), (30, 6, 32, 28), (30, 11, 32, 28), (30, 16, 32, 28), (30, 21, 32, 28), (30, 26, 32, 28), and (30, 36, 32, 28) obtained by replacing a pulse position "31" with another pulse position. When the pulse position of track 2 is replaced, fixed-codebook search criterion values $Q_k$ are calculated for respective codevectors (30, 31, 2, 28), (30, 31, 7, 28), (30, 31, 12, 28), (30, 31, 17, 28), (30, 31, 22, 28), (30, 31, 27, 28), and (30, 31, 37, 28) obtained by replacing a pulse position "32" with another pulse position. When the pulse position of track 3 is replaced, fixed-codebook search criterion values $Q_k$ are calculated for respective codevectors (30, 31, 32, 3), (30, 31, 32, 8), (30, 31, 32, 13), (30, 31, 32, 18), (30, 31, 32, 23), (30, 31, 32, 28), (30, 31, 32, 33), (30, 31, 32, 38), (30, 31, 32, 9), (30, 31, 32, 14), (30, 31, 32, 19), (30, 31, 32, 24), (30, 31, 32, 29), (30, 31, 32, 34), and (30, 31, 32, 39) obtained by replacing a pulse position "28" with another pulse position.

In step 340, among fixed-codebook search criterion values for the codevectors obtained by replacing pulses one by one according to the respective tracks, a largest value is searched per track. For example, the 4 largest fixed-codebook search criterion values $Q_k$, i.e., one largest value per track, are searched from 7 fixed-codebook search criterion values $Q_k$ obtained by replacing the pulse positions of the initial codevector of Table 2 with the pulse position of track 0 one by one, 7 fixed-codebook search criterion values $Q_k$ obtained by replacing the pulse positions of the initial codevector with the pulse position of track 1 one by one, 7 fixed-codebook search criterion values $Q_k$ obtained by replacing the pulse positions of the initial codevector with the pulse position of track 2 one by one, and 15 fixed-codebook search criterion values $Q_k$ obtained by replacing the pulse positions of the initial codevector with the pulse position of track 3 one by one.

In step 350, pulse positions generating the largest values according to the respective tracks are determined as candidate pulse positions of the respective tracks. For example, when (5, 31, 32, 28) generate the largest fixed-codebook search criterion value $Q_k$ in track 0, the candidate pulse position of track 0 is 5. When (30, 21, 32, 28) generate the largest fixed-codebook search criterion value $Q_k$ in track 1, the candidate pulse position of track 1 is 21. When (30, 31, 17, 28) generate the largest fixed-codebook search criterion value $Q_k$ in track 2, the candidate pulse position of track 2 is 17. When (30, 31, 32, 19) generate the largest fixed-codebook search criterion value $Q_k$ in track 3, the candidate pulse position of track 3 is 19.

In step 360, criterion values $Q_{cmb\_k}$ are calculated for respective codevectors of all combinations that can be obtained by replacing at least one of the pulse positions of the initial codevector with the candidate pulse position of each track. More specifically, the criterion values $Q_{cmb\_k}$ are calculated for all combinations obtained by replacing a pulse of one track, pulses of 2 tracks, pulses of 3 tracks, and pulses of 4 tracks in the initial codevector.

For example, all the combinations that can be obtained by replacing at least one of the pulse positions (30, 31, 32, 28) of the initial codevector with at least one of pulse positions (5, 21, 17, 19) of the respective candidate pulse positions include: 4 combinations (${}_4C_1$) (5, 31, 32, 28), (30, 21, 32, 28), (30, 31, 17, 28) and (30, 31, 32, 19) obtained by replacing a pulse of one track in the initial codevector; 6 combinations (${}_4C_2$) (5, 21, 32, 28), (5, 31, 17, 28), (5, 31, 32, 19), (30, 21, 17, 28), (30, 21, 32, 19) and (30, 31, 17, 19) obtained by replacing pulses of 2 tracks in the initial codevector; 4 combinations (${}_4C_3$) (5, 21, 17, 28), (5, 21, 32, 19), (5, 31, 17, 19) and (30, 21, 17, 19) obtained by replacing pulses of 3 tracks in the initial codevector; and one combination (${}_4C_4$) (5, 21, 17, 19) obtained by replacing pulses of 4 tracks in the initial codevector.

In step 370, a largest criterion value $Q_{max}$ is searched from the criterion values $Q_{cmb\_k}$ calculated for the codevectors of all obtainable combinations. For example, the largest criterion value is calculated for the above mentioned 15 combinations of pulse positions.

In step 380, the criterion value $Q_{init}$ of the initial codevector calculated in step 320 and the largest criterion value $Q_{max}$ derived from all obtainable combinations in step 370 are compared with each other.

When the largest criterion value $Q_{max}$ derived from all obtainable combinations is larger than the criterion value $Q_{init}$ of the initial codevector, pulses are replaced with pulse positions generating the largest criterion value $Q_{max}$ to determine an optimum codevector (step 400). Otherwise, the initial codevector is determined as an optimum codevector (step 390). For example, when pulse positions (5, 31, 17, 28) obtained by replacing pulses of 2 tracks in the initial codevector among the above mentioned 15 combinations of pulse positions generate the largest criterion value, and the largest criterion value is larger than the criterion value of the initial codevector, (5, 31, 17, 28) is determined as pulse positions of an optimum codevector.

In addition, as shown in Table 3 below, sound quality varies according to a method of determining an initial codevector and a method of determining signs of Formula 4 and 5 on a criterion value calculation process in the inventive iteration-free global-pulse replacement method and a conventional global-pulse replacement method.

TABLE 3

| Fixed-codebook search method | M1 | M2 | M3 | M4 |
|---|---|---|---|---|
| Conventional global-pulse replacement method | 3.758 | 3.759 | 3.763 | 3.756 |
| Iteration-free global-pulse replacement method | 3.730 | 3.737 | 3.747 | 3.745 |

M1: determine an initial codevector using the correlation vector or backward filtered target vector d & $s_i$=sign {d(i)}

M2: determine an initial codevector using the correlation vector or backward filtered target vector d & $s_j$=sign{b(i)}

M3: determine an initial codevector using the pulse-position likelihood-estimate vector b & $s_i$=sign{d(i)}

M4: determine an initial codevector using the pulse-position likelihood-estimate vector b & $s_j$=sign{b(i)}

Table 4 below shows computational loads of a depth-first tree search method, a conventional global-pulse replacement method, and the inventive iteration-free global-pulse replacement method employed in the G.729.1 8-kbps mode.

TABLE 4

| Fixed-codebook search method | Computational load | PESQ |
|---|---|---|
| Depth-first tree search method | 320 | 3.76 |
| Conventional global-pulse replacement method | 118 | 3.76 |
| Iteration-free global-pulse replacement method | 48 | 3.75 |

Among the above mentioned examples, the conventional global-pulse replacement method iterates a pulse replacement process 4 times, and experimental speech samples are shown in Table 5 below. Perceptual evaluation of speech quality (PESQ) denotes an evaluation standard for comparing an original signal with an attenuated signal that is the original signal passed through a communication system.

TABLE 5

| Speech sample type | Noise level | Remarks |
|---|---|---|
| Korean | — | 3 males & 3 females with each 5 samples |
| Korean + Music Noise | 25 dB SNR | 3 males & 3 females with each 5 samples |
| Korean + Office Noise | 20 dB SNR | 3 males & 3 females with each 5 samples |
| Korean + Babble Noise | 30 dB SNR | 3 males & 3 females with each 5 samples |
| Korean + Interfering Talker | 15 dB SNR | 3 males & 3 females with each 5 samples |

According to such experimental results, a method of determining an initial codevector and a method of determining signs of Formula 4 and 5 on a criterion value calculation process may vary according to various languages. Therefore, it is preferable to use a method that is most appropriate for various linguistic characteristics.

The iteration-free pulse replacement method has the almost same sound quality as the depth-first tree search method and the conventional global-pulse replacement method but remarkably reduces a computational load. Therefore, when a fixed codebook is searched by the iteration-free replacement method, it is possible to maintain sound quality as is while drastically reducing the computational load.

There are some reasons why, as described above, the iteration-free global-pulse replacement method can maintain sound quality as is while drastically reducing the computational load in comparison with the conventional global-pulse replacement method. First, an optimum codevector is highly likely to be obtained by replacing the pulse positions of an initial codevector with candidate pulse positions of respective tracks. Second, the conventional global-pulse replacement method iterates a process of replacing pulses one by one 4 times to replace the pulse positions of an initial codevector with candidate pulse positions of respective tracks, but the iteration-free global-pulse replacement method compares all combinations that can be obtained by replacing the pulse positions of an initial codevector with candidate pulse positions of respective tracks at a time, thereby removing the unnecessary iteration process.

The fixed codebook search method in a speech codec according to the present invention can be uniformly applied to searches of several types of fixed codebooks having an algebraic codebook structure.

The above described method of the present invention can be implemented as a program, which can be stored in computer-readable recording media, e.g., a Compact Disk Read-Only Memory (CD-ROM), a Random-Access Memory (RAM), a Read-Only Memory (ROM), a floppy disk, a hard disk, a magneto-optical disk, etc., or used in audio terminals such as a cellular phone and a Voice over Internet Protocol (VoIP) phone.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A non-transitory computer-readable recording medium having a program stored thereon for:

(a) determining an initial codevector by using a pulse-position likelihood vector or a correlation vector;

(b) calculating a fixed-codebook search criterion value for the initial codevector;

(c) calculating fixed-codebook search criterion values for respective codevectors obtained by replacing a pulse of the initial codevector each time for respective tracks, and determining a pulse position generating the largest fixed-codebook search criterion value as a candidate pulse position for the respective tracks, respectively;

(d) calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) comparing the fixed-codebook search criterion value for the initial codevector obtained in step (b) with the largest value determined in step (d) to determine an optimum fixed codevector.

2. The non-transitory computer-readable recording medium of claim 1, wherein in (a), the program uses a pulse-position likelihood-estimate vector or a correlation vector according to characteristics of a language to be processed by the speech codec.

3. The non-transitory computer-readable recording medium of claim 1, wherein in (b) to (d), the program calculates fixed codebook search criterion values using a correlation vector or a pulse-position likelihood-estimate vector according to characteristics of a language to be processed by the speech codec.

4. The non transitory computer-readable recording medium of claim 1, wherein (e) comprises:

(e1) when it is determined that the fixed-codebook search criterion value for the initial codevector is larger than the largest value determined in (d), determining the initial codevector as an optimum fixed codevector, and (e2) when it is determined that the largest value determined in (d) is larger than the fixed-codebook search criterion value for the initial codevector, determining a codevector generating the largest value as an optimum codevector.

5. A Code-Excited Linear-Prediction (CELP) encoder comprising a linear prediction analyzer, an adaptive codebook searcher, and a fixed codebook searcher, wherein to search a fixed codebook, the fixed codebook searcher comprises:

(a) means for determining an initial codevector using a pulse-position likelihood-vector or a correlation vector;

(b) means for calculating a fixed-code book search criterion value for the initial codebook vector, (c) means for calculating fixed-codebook search criterion values of respective codevectors obtained by replacing a pulse of the initial codevector each time for respective tracks, and determining a pulse position generating the largest fixed codebook search criterion value as a candidate pulse position for the respective tracks, respectively;

(d) means for calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) means for comparing the fixed-codebook search criterion value for the initial codevector obtained by the means (b) with the largest value determined by the means (d) to determine an optimum fixed codevector.

6. A Code-Excited Linear-Prediction (CELP)-based speech codec comprising an encoder and a decoder, wherein the encoder comprises:

an encoder that determines an initial codevector using a pulse-position likelihood vector or a correlation vector;

Quadrature Mirror Filter (QMF) banks for dividing an input signal into a low-band input signal and a high-band input signal;

a high-pass filter for performing a preprocess of removing frequency components equal to or less than a predetermined frequency from the low-band input signal;

a CELP encoder for encoding a signal output from the high-pass filter to generated a narrow-band synthesis signal;

a perceptual weighting filter for weighting a difference signal between the signal preprocessed by the high-pass filter and the synthesis signal generated by the CELP encoder;

a first Modified Discrete Cosine Transform (MDCT) for converting the difference signal weighted by the perceptual weighting filter into a frequency domain signal;

a low-pass filter for performing a preprocess of removing frequency components more than a predetermined frequency from the high-band input signal;

a Time-Domain Bandwidth Extension (TDBWE) encoder for encoding the signal preprocessed by the low-pass filter;

a second MDCT for converting the signal preprocessed by the low-pass filter into a frequency-domain signal; and a Time-Domain Aliasing Cancellation (TDAC) encoder for encoding the frequency-domain signals converted by the MDCTs, wherein the CELP encoder performs fixed code book search by (a) determining an initial codevector by using a pulse-position likelihood vector or a correlation vector; (b) calculating a fixed-codebook search criterion value for the initial codevector; (c) calculating fixed-codebook search criterion values for respective codevectors obtained by replacing a pulse of the initial codevector each time for respective tracks, and determining a pulse position generating the largest fixed-codebook search criterion value as a candidate pulse position for the respective tracks, respectively; (d) calculating fixed-codebook search criterion values for respective codevectors of all combinations obtained by replacing at least one pulse position of the initial codevector with the candidate pulse positions of the respective tracks, and determining the largest value of the fixed-codebook search criterion values; and (e) comparing the fixed-codebook search criterion value for the initial codevector with the largest value of the fixed-codebook search criterion values to determine an optimum fixed codevector.

7. An audio terminal having the Code-Excited Linear-Prediction (CELP)-based speech codec of claim 6.

* * * * *